(12) United States Patent
Clevenger et al.

(10) Patent No.: US 9,640,220 B2
(45) Date of Patent: May 2, 2017

(54) MANAGING TIME-SHIFT DATA

(71) Applicant: THOMSON LICENSING, Issy de Moulineaux (FR)

(72) Inventors: Brian Duane Clevenger, Muncie, IN (US); Mark Allen McCleary, Indianapolis, IN (US); Bruno Le Garjan, Rennes (FR); Benjamin Allen Pullen, Redmond, WA (US)

(73) Assignee: THOMSON LICENSING, Issy les Moulineaux (FR)

( * ) Notice: Subject to any disclaimer, the term of this patent is extended or adjusted under 35 U.S.C. 154(b) by 98 days.

(21) Appl. No.: 14/363,558

(22) PCT Filed: Dec. 20, 2012

(86) PCT No.: PCT/US2012/070903
§ 371 (c)(1),
(2) Date: Jun. 6, 2014

(87) PCT Pub. No.: WO2013/106184
PCT Pub. Date: Jul. 18, 2013

(65) Prior Publication Data
US 2014/0369666 A1 Dec. 18, 2014

Related U.S. Application Data

(60) Provisional application No. 61/584,351, filed on Jan. 9, 2012.

(51) Int. Cl.
*H04N 9/80* (2006.01)
*H04N 5/76* (2006.01)
(Continued)

(52) U.S. Cl.
CPC ............ *G11B 27/102* (2013.01); *H04N 5/76* (2013.01); *H04N 21/4333* (2013.01);
(Continued)

(58) Field of Classification Search
None
See application file for complete search history.

(56) References Cited

U.S. PATENT DOCUMENTS

| 6,728,720 | B1 | 4/2004 | Lenzie |
| 7,917,499 | B2 | 3/2011 | Kleewein et al. |

(Continued)

OTHER PUBLICATIONS

Graefe, Goetz, et al. "Adaptive indexing for relational keys." Data Engineering Workshops (ICDEW), 2010 IEEE 25th international Conference on. IEEE, 2010.

(Continued)

*Primary Examiner* — Hung Dang
(74) *Attorney, Agent, or Firm* — Brian J. Dorini; Robert D. Shedd

(57) ABSTRACT

There are provided respective systems and methods for recording and playing back media content. The system for recording media content includes a segmenter (303) for splitting transport stream data and index data corresponding to the media content into discrete files at periodic intervals on access point boundaries. Each of the discrete files includes a respective transport segment and a respective index segment. The system also includes a segment storage device (304) for storing the discrete files.

17 Claims, 13 Drawing Sheets

(51) Int. Cl.
    *G11B 27/10*     (2006.01)
    *H04N 21/433*     (2011.01)
    *H04N 21/845*     (2011.01)
    *H04N 9/82*     (2006.01)

(52) U.S. Cl.
    CPC ..... *H04N 21/4334* (2013.01); *H04N 21/8456* (2013.01); *H04N 9/8205* (2013.01)

(56) References Cited

U.S. PATENT DOCUMENTS

| | | | |
|---|---|---|---|
| 2003/0093790 A1* | 5/2003 | Logan | G06F 17/30265 725/38 |
| 2003/0093810 A1 | 5/2003 | Taniguchi | |
| 2004/0243555 A1 | 12/2004 | Bolsius et al. | |
| 2004/0252604 A1* | 12/2004 | Johnson | G06F 17/30772 369/47.22 |
| 2005/0254363 A1* | 11/2005 | Hamada | G11B 27/034 369/47.1 |
| 2006/0064733 A1* | 3/2006 | Norton | G11B 19/025 725/135 |
| 2007/0118873 A1* | 5/2007 | Houh | G06F 17/30746 725/136 |
| 2008/0049574 A1 | 2/2008 | Yahata | |
| 2008/0101764 A1* | 5/2008 | Johannesson | G11B 27/11 386/241 |
| 2008/0267588 A1* | 10/2008 | Iwase | G11B 20/10 386/248 |
| 2010/0034508 A1* | 2/2010 | Morimoto | G11B 20/1217 386/283 |
| 2010/0180291 A1* | 7/2010 | Kahn | G06F 21/10 725/31 |
| 2011/0246616 A1* | 10/2011 | Ronca | H04N 21/26258 709/219 |
| 2012/0087637 A1* | 4/2012 | Logan | H04H 20/28 386/241 |
| 2012/0254365 A1* | 10/2012 | Adimatyam | H04L 65/4084 709/219 |
| 2012/0278619 A1* | 11/2012 | Tam | H04N 21/23473 713/168 |

OTHER PUBLICATIONS

Boehm, Andreas M., et al. "Squash: a tool for analyzing, tuning and refactoring relational database applications." Applications of Declarative Programming and Knowledge Management. Springer Beriin Heidelberg, 2009. 82-98.
Koeller, Andrea, et al., "Incremental maintenance of schema-restructuring views." Advances in Database Technology-ŠEDBT 2002. Springer Benin Heidelberg, 2002. 354-371.
International Search Report for PCT/US12/70903 dated Apr. 12, 2013.

* cited by examiner

MANAGING TIME-SHIFT DATA

CROSS-REFERENCE TO RELATED APPLICATIONS

This application claims the benefit, under 35 U.S.C. §365 of International Application PCT/US12/70903, filed 20 Dec. 2012, which was published in accordance with PCT Article 21(2) on 18 Jul. 2013 in English and which claims the benefit of U.S. provisional patent application No. 61/584,351, filed 9 Jan. 2012.

TECHNICAL FIELD

The present principles relate generally to time-shift functionality and, more particularly, to managing time-shift data.

BACKGROUND

The core functionality of a Digital Video Recorder (DVR) is to record and playback broadcast multimedia content such as video content (and any audio content corresponding thereto, but collectively referred to hereinafter as "video content" for the sake of brevity). Many DVRs allow time-shift functionality. Time-shift functionality is essentially a rolling buffer of live broadcast content. This allows trick mode operations such as pause, rewind, and fast forward to be used on live broadcast content. A typical time-shift implementation will maintain a buffer of the last 30 minutes of live broadcast content, allowing the user to navigate this buffer with trick modes.

Since the storage of video content requires significant storage space, the video data used for time-shift functionality is usually stored on a hard disk in most implementations. This presents problems because as new data is added to a time-shift recording, old data must be truncated from the end. While most file systems allow efficient insertion of new data at the end of a file, most file systems do not provide an efficient mechanism for truncating data from the beginning of a file. Some DVRs solve this problem by using a specially designed file system that provides for insertion at the end of a file as well as truncation from the beginning of a file. However, the use of a specially designed file system is not with deficiencies including, but not limited to, the integration of such specially designed file systems with the standard file systems that are also used in DVRs.

SUMMARY

These and other drawbacks and disadvantages of the prior art are addressed by the present principles, which are directed to managing time-shift data.

According to an aspect of the present principles, there is provided a system for recording media content. The system includes a segmenter for splitting transport stream data and index data corresponding to the media content into discrete files at periodic intervals on access point boundaries. Each of the discrete files includes a respective transport segment and a respective index segment. The system also includes a segment storage device for storing the discrete files.

According to another aspect of the present principles, there is provided a method for recording media content. The method includes splitting transport stream data and index data corresponding to the media content into discrete files at periodic intervals on access point boundaries. Each of the discrete files includes a respective transport segment and a respective index segment. The method also includes storing the discrete files in a segment storage device.

According to yet another aspect of the present principles, there is provided a system for playing back media content. The system includes a segment storage device for storing discrete files. Each of the discrete files includes a respective transport segment and a respective index segment obtained from transport stream data and index data corresponding to the media content. The system also includes a desegmenter for re-assembling transport segments from the discrete files for seamless playback of the transport segments.

According to still another aspect of the present principles, there is provided a method for playing back media content. The method includes storing discrete files in a segment storage device. Each of the discrete files includes a respective transport segment and a respective index segment obtained from transport stream data and index data corresponding to the media content. The method also includes re-assembling transport segments from the discrete files for seamless playback of the transport segments.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to managing time-shift data.

While one of ordinary skill in the art will readily contemplate various applications to which the present principles can be applied, the following description will focus on embodiments of the present principles applied to a set-top box with digital video recorder functionality and the time-shift functionality. However, one of ordinary skill in the art will readily contemplate other devices and applications to which the present principles can be applied, given the teachings of the present principles provided herein, while maintaining the spirit of the present principles. For example, the present principles can be incorporated into any device that has multimedia playback capability along with recording and time-shift functionality. Accordingly, the present principles can be incorporated into a set-top box with digital video recorder (DVR) capabilities, a stand-alone DVR, a home media server, a computer media station, a tablet device, a home network gateway, a multi-media player, a home networking appliance, and so forth. It is to be appreciated that the preceding listing of devices is merely illustrative and not exhaustive.

Regarding the aforementioned prior art, and the use of a specially designed file system to address the problem of adding new data to a time-shift recording while truncating old data from the end of the time-shift recording, we initially point out that the present principles solve this problem without requiring a specially designed file system. Advantageously, this allows standard file systems (also referred to herein as "existing" or "legacy" file systems) to be used for video storage. Moreover, the present principles allow for the sharing of transport data between overlapping recordings, which reduces storage space.

Figure 1:
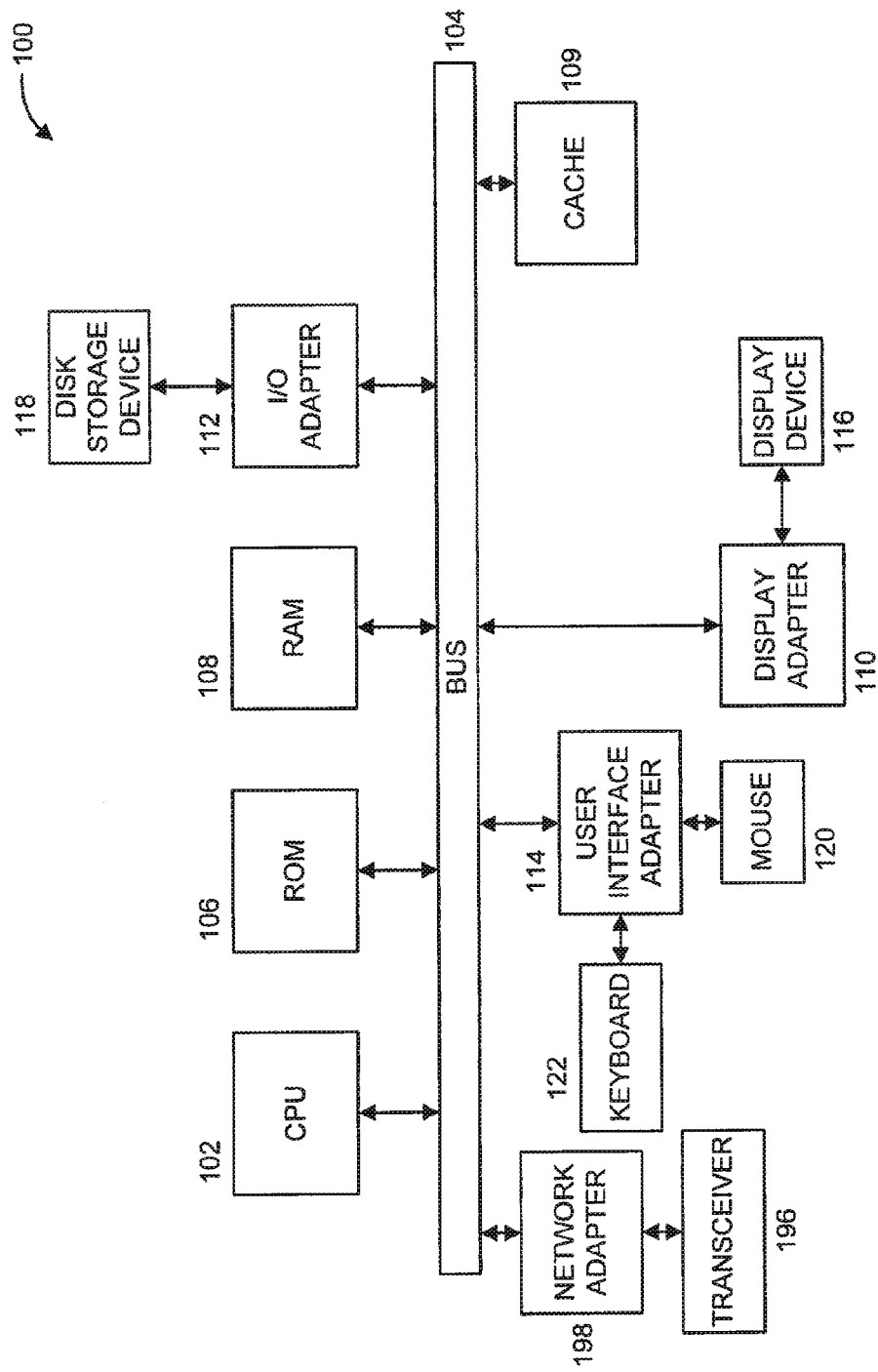
FIG. 1 is a diagram showing an exemplary processing system 100 to which the present principles can be applied, in accordance with an embodiment of the present principles.

FIG. 1 shows an exemplary processing system 100 to which the present principles may be applied, in accordance with an embodiment of the present principles. The processing system 100 includes at least one processor (CPU) 102 operatively coupled to other components via a system bus 104. A read only memory (ROM) 106, a random access memory (RAM) 108, a display adapter 110, an input/output (I/O) adapter 112, a user interface adapter 114, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keyboard 122 are operatively coupled to system bus 104 by user interface adapter 214. The mouse 120 and keyboard 122 are used to input and output information to and from system 100.

A transceiver 196 is operatively coupled to system bus 104 by network adapter 198.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
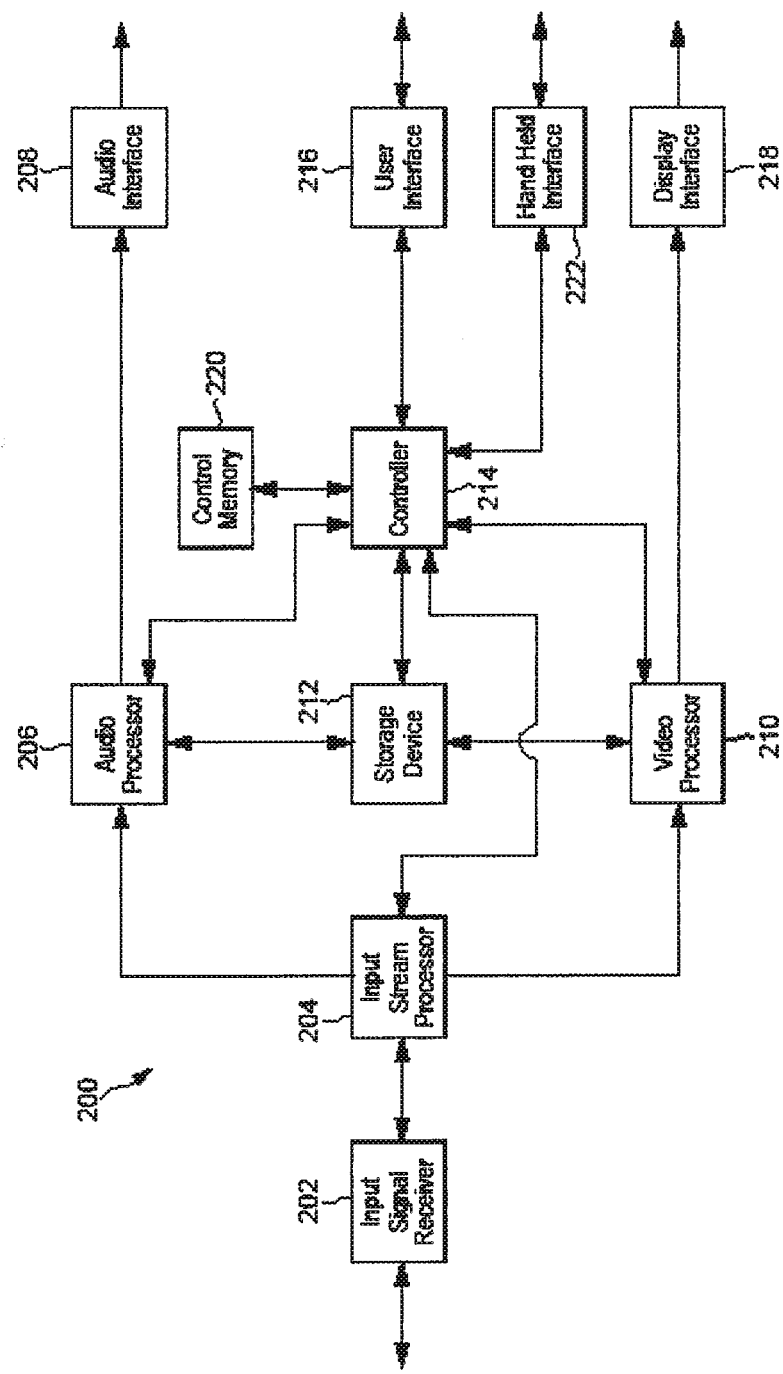
FIG. 2 is a diagram showing an exemplary set-top box 200 including digital video recorder functionality and time-shift functionality, in accordance with an embodiment of the present principles.

Moreover, it is to be appreciated that set-top box 200 described below with respect to FIG. 2 is a set-top box 200 for implementing respective embodiments of the present principles. Further, it is to be appreciated that recording pipeline 300 and playback pipeline 400 described below with respect to FIGS. 3 and 4, respectively, are included within set-top box 200. Of course, as noted above, the present principles are not limited to a set-top box and, thus, the recording pipeline 300 and playback pipeline 400 can be incorporated into other devices, some of which have been mentioned above, while maintaining the spirit of the present principles. Part or all of processing system 100 may be implemented in one or more of the elements of set-top box 200 (or other device), recording pipeline 300, and/or playback pipeline 400.

Figure 6:
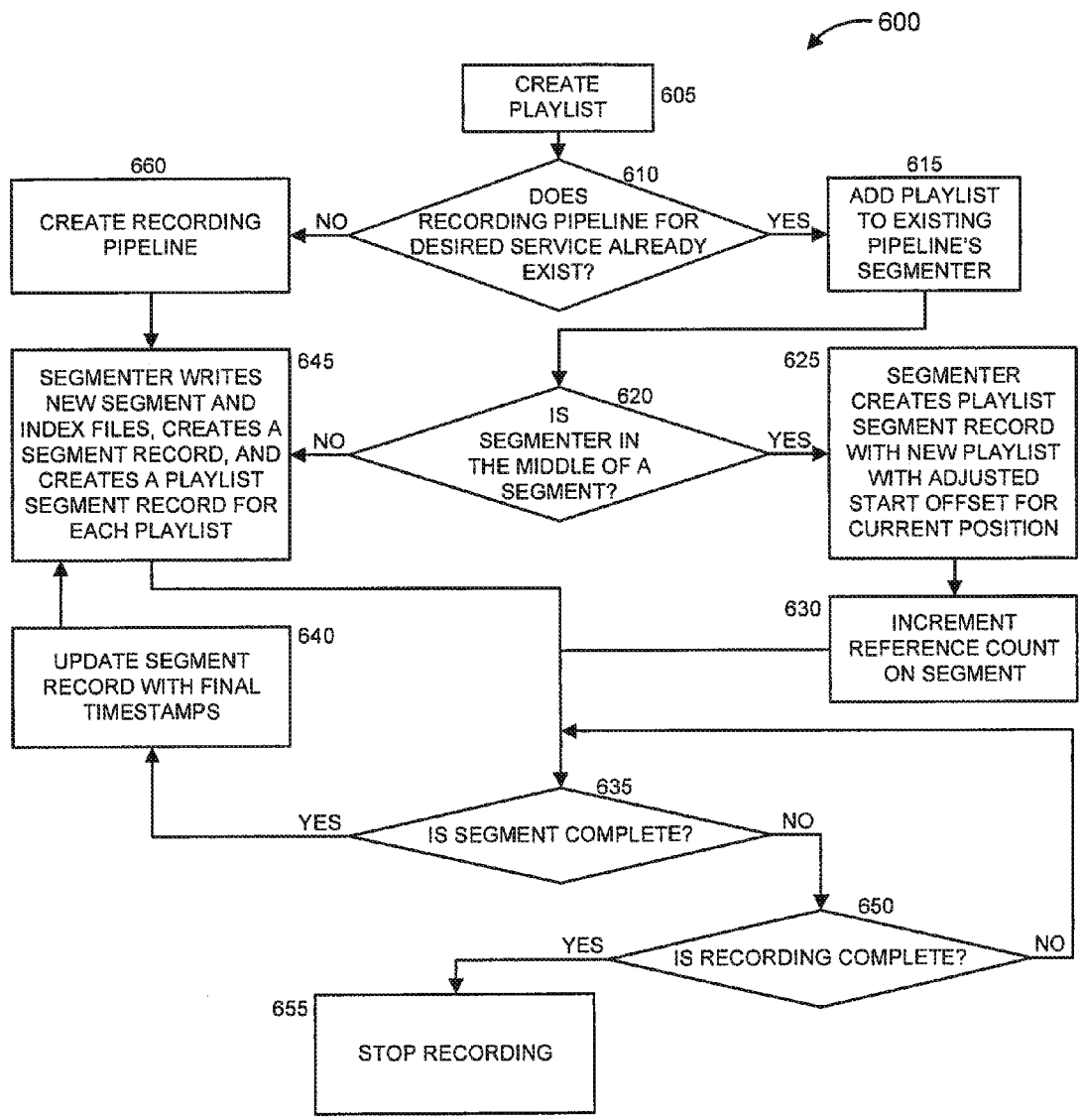
FIG. 6 is a diagram showing an exemplary method 600 for starting a recording, in accordance with an embodiment of the present principles.
Figure 7:
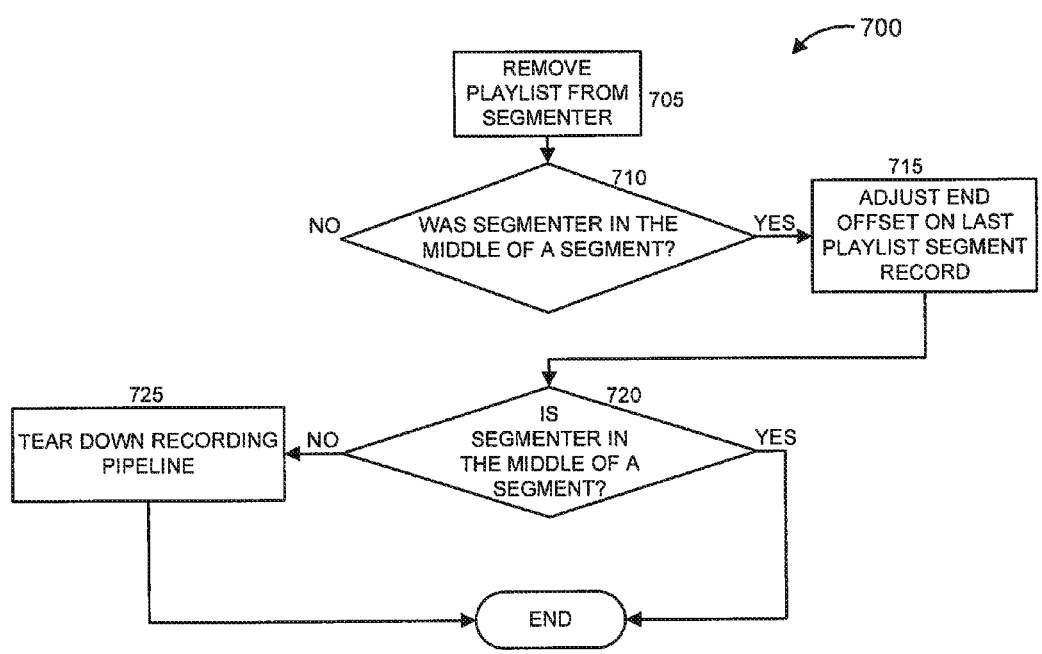
FIG. 7 is a diagram showing an exemplary method 700 for stopping a recording, in accordance with an embodiment of the present principles.

Additionally, it is to be appreciated that processing system 100 may perform at least part of the method described herein including, for example, at least part of method 600 of FIG. 6 and/or at least part of method 700 of FIG. 7. Similarly, part or all of set-top box 200, recording pipeline 300, and/or playback pipeline 400 may be used to perform at least part of method 600 and/or at least part of method 700.

FIG. 2 shows an exemplary set-top box 200 including digital video recorder functionality and time-shift functionality, in accordance with an embodiment of the present principles. It is to be appreciated that several components necessary for complete operation of the set-top box 200 are not shown in the interest of conciseness, as the components not shown are well known to those skilled in the art.

Signals are interfaced to set-top box 200 at input signal receiver 202. Input signal receiver 202 connects to input stream processor 204. The input stream processor 204 connects to audio processor 206 and video processor 210. Audio processor 206 connects to audio interface 208, which provides the audio output signal from set-top box 200. Video processor 210 connects to display interface 218, which provides the video output signal from set-top box 200. Audio processor 206 and video processor 210 also connect to a storage device 212. A controller 214 connects to the storage device 212, as well as input stream processor 204, audio processor 206, and video processor 210. A control memory 220 connects to the controller 214. Controller 214 also connects to user interface 216 and handheld interface 222.

The content is received in an input signal receiver 202. The input signal receiver 202 may be one or more of several known receiver circuits used for receiving, demodulation, and decoding signals provided over one of the several possible networks including over the air, cable, satellite, Ethernet, fiber and phone line networks. It is important to note that input signal receiver 202 may include receiving, demodulation, and decoding circuitry for data signals as well as media content signals delivered over either the same delivery network as the desired broadcast input signal or over a different network, and/or an alternative cellular or wireless network. The received media content and data over delivery network 2 (or wireless network may be different from the media content and delivery network 1. The data may include information associated with scheduling changes and updates as well as information related to the media content delivered over either delivery network. In one embodiment, a cable broadcast signal is received, demodulated, and decoded in a cable tuner circuit in signal receiver 202. The desired broadcast input signal may be selected and retrieved in the input signal receiver 202 based on user input provided through a control interface (not shown). Input signal receiver 202 also includes an Internet protocol (IP) interface circuit that additionally provides bi-directional network connectivity.

The decoded output signal from one or more of the circuits in input signal receiver 202 is provided to an input stream processor 204. The input stream processor 204 performs the final signal selection and processing, and includes separation of video content from audio content for the content stream. The audio content is provided to an audio processor 206 for conversion from the received format (e.g., compressed digital signal) to another format (e.g., analog waveform signal). The analog waveform signal is provided to an audio interface 208 and further to the display device 114 or an audio amplifier (not shown). Alternatively, the audio interface 208 may provide a digital signal to an audio output device or display device using a High-Definition Multimedia Interface (HDMI) cable or alternate audio interface such as via a Sony/Philips Digital Interconnect Format (SPDIF). The audio processor 206 also performs any necessary conversion for the storage of the audio signals.

The video output from the input stream processor 204 is provided to a video processor 210. The video signal may be one of several formats. The video processor 210 provides, as necessary a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216. The storage device 212 may be a hard disk drive, one or more large capacity integrated electronic memories, such as static RAM (SRAM), or dynamic RAM (DRAM), an interchangeable optical disk storage system such as a compact disk drive or digital video disk drive, or storage external to, and accessible by, set-top box 200.

The converted video signal, from the video processor 210, either originating from the input or from the storage device 212, is provided to the display interface 218. The display interface 218 further provides the display signal to a display device of the type described above. The display interface 218 may be an analog signal interface, such as red-green-blue (RGB), or may be a digital interface (e.g., HDMI).

The controller 214 is interconnected via a bus to several of the components of the set-top box 200, including the input stream processor 202, audio processor 206, video processor 210, storage device 212, user interface 216, and handheld interface 222. The controller 214 manages the conversion process for converting the input stream signal into a signal for storage on the storage device or for display. The controller 214 also manages the retrieval and playback of stored content. The controller 214 is further coupled to control memory 220 (e.g., volatile or non-volatile memory, including RAM, SRAM, DRAM, read only memory (ROM), programmable ROM, electronically programmable ROM (EPROM), electronically erasable programmable ROM (EEPROM), flash memory, etc.) for storing information and instruction code for controller 214. Further, the implementation of the memory 220 may include several possible embodiments, such as a single memory device or, alternatively, more than one memory circuit connected together to form a shared or common memory. Still further, the memory may be included with other circuitry, such as portions of bus communications circuitry, in a larger circuit.

In addition to interfacing to a user interface element and a display device, set-top box 200 may also interface to a handheld device, such as a tablet, through handheld interface 222. This handheld device may include a display screen with additional controls or may include a touch screen. Video signals from video processor 210 as well as other data, such as the on-screen display messages and message prompt returns, may be routed between controller 214 and handheld interface 222. Handheld interface 222 may transmit and receive signals and data with a handheld device or tablet using a radio frequency communications link, such as Wi-Fi, Bluetooth, or the Institute of Electrical and Electronics Engineers (IEEE) standard 802.11. Handheld interface 222 may alternatively transmit and receive signals and data with a handheld device or tablet using an infra-red interface.

In operation, set-top box 200 implements a process for updating, managing, and searching a media content database in a client device, such as a set-top box or home gateway, as described in further detail below. The physical implementation of the algorithm or function may be done in hardware, such as discrete circuitry related to the video processor 210, or software, such as software residing in the control memory 220 and read and executed by the controller 214. The method involves receiving event data associated with media content, the event data including a unique event identifier, examining the event identifier to store the event data in an array in a cache memory, updating an event count value if the event identifier in the received event data is not currently in the array, and updating a first event database with the event data in the array if a swap of the cache memory is triggered, such as when at least one of an event count value exceeds a predetermined threshold and a time period value exceeds a predetermined threshold.

Operational aspects of a device, such as set-top box 200, that is used as a media storage and interface device typically include the storage, maintenance, searching, retrieval of the media content as well as the database entries or records for identifying the content. Updating of the database information and entries is important in a dynamic system that can include periodic or continual content information updates. For instance, new database records or information may be received and provided to the database. Additionally, currently stored content and entries or information associated with the content may be removed or erased. The content may be removed or erased on a periodic basis or alternatively through inputs to the device from a user control. Simultaneously, or nearly simultaneously, a request, such as a database search request, may be made. In general, all sorts and forms of content and information may be received from multiple sources and input to the database. It is important that a stable database be available for the search request. The data and information needs to be added to the database while still maintaining the search capability and keeping the search results and performance of the search as high as possible. Improvements to updating and searching in the database are even more desirable in a simple database structure (e.g., the structure implemented in a structured query language (SQL) database).

The functioning and control for the updating, managing, and searching of a media content database as described herein may be encompassed as part of the operating code or firmware associated with a gateway device (e.g., set-top box 200). The process may include operating instructions written in any programming language (e.g., Java or hypertext markup language (HTML)). The application may be pre-loaded or downloaded (e.g., from a server or Internet site), and stored in a memory of the host device. It is to be appreciated that in one embodiment the instructions are stored in control memory 220 of FIG. 2 where the instructions are retrieved thereon and executed by controller 214. In another embodiment, the memory and a corresponding processor or controller to perform the processing may be integrated into a separate stand-alone integrated circuit (e.g., a digital processing processor (DSP) or an application specific integrated circuit (ASIC)).

Figure 3:
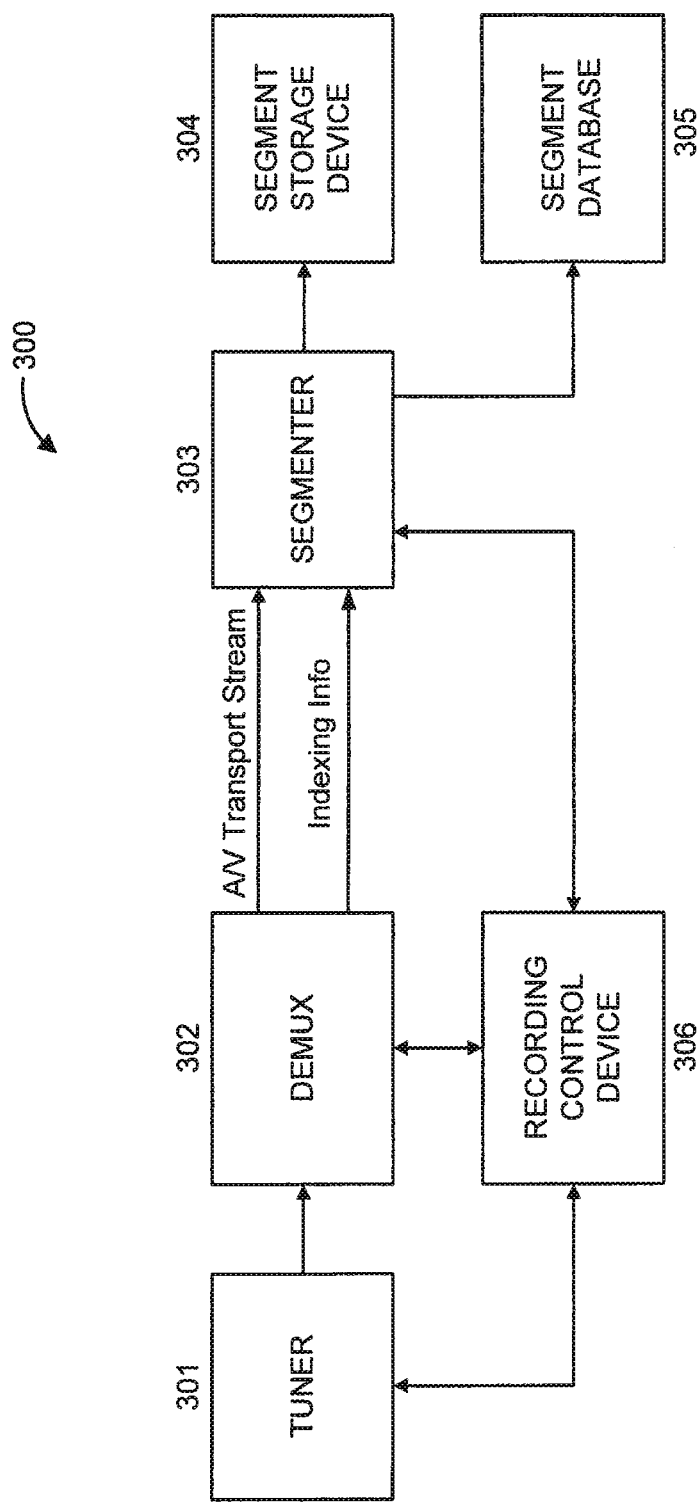
FIG. 3 is a diagram showing an exemplary recording pipeline 300 to which the present principles can be applied, in accordance with an embodiment of the present principles.

FIG. 3 shows an exemplary recording pipeline 300 to which the present principles can be applied, in accordance with an embodiment of the present principles. In an embodiment, the recording pipeline 300 is included within the set-top box 200 of FIG. 2. However, as noted above, the recording pipeline 300 can be included in other devices including, but not limited to, a stand-alone DVR, a home media server, a computer media station, a tablet device, a home network gateway, a multi-media player, a home networking appliance, and so forth.

The recording pipeline 300 includes a tuner 301, a demultiplexer (demux) 302, a segmenter 303, a segment storage device 304, a segment database 305, and a recording control device 306.

Broadcast video is received by the tuner 301. The tuner 301 could be a hardware tuner such as a digital video broadcasting (DVB) or advanced television systems committee (ATSC) tuner or an Internet protocol television (IPTV) tuner that receives transport streams over a network interface (not depicted). The transport stream received by the tuner 301 is sent to the demultiplexer 302.

In the case of multi-program transport streams, the demultiplexer 302 may select the desired program and send a single program transport stream along with indexing information to the segmenter 303. In the case of single program transport streams, the demultiplexer 302 may transparently send the received transport stream to the segmenter 303 without modification, but additionally provide indexing information for the associated stream. In both cases, the indexing information includes a list of access points in the stream and their associated presentation time stamps (PTS). An access point marks a position in the stream where decoding can begin.

The segmenter 303 breaks the transport stream data and indexing data into discrete segments and writes this data to segment storage device 304. Segment storage device 304 would typically be a hard disk with a file system. Of course, segment storage device 304 can be implemented in a different type of memory device with a file system, as is readily appreciated by one of ordinary skill in the art, given the teachings of the present principles provided herein.

Each transport segment and index segment is stored as a unique file in the file system. The size of the segments can be adjusted based on performance considerations for a specific system, but a typical segment size would include approximately 1 to 5 minutes of data. As each segment is written, the segmenter 303 updates the segment database 305 with information about the segments it creates.

The recording control device 306 interacts with the tuner 301, demultiplexer 302, and segmenter 303 to control recordings. The recording control device 306 controls and/or otherwise indicates to the tuner 301 to tune to the service to be recorded. The recording control device 306 controls and/or otherwise indicates to the demultiplexer 302 which program in the transport stream to record, and it gives the segmenter 303 a list of playlists to associate with the recorded segments.

Figure 4:
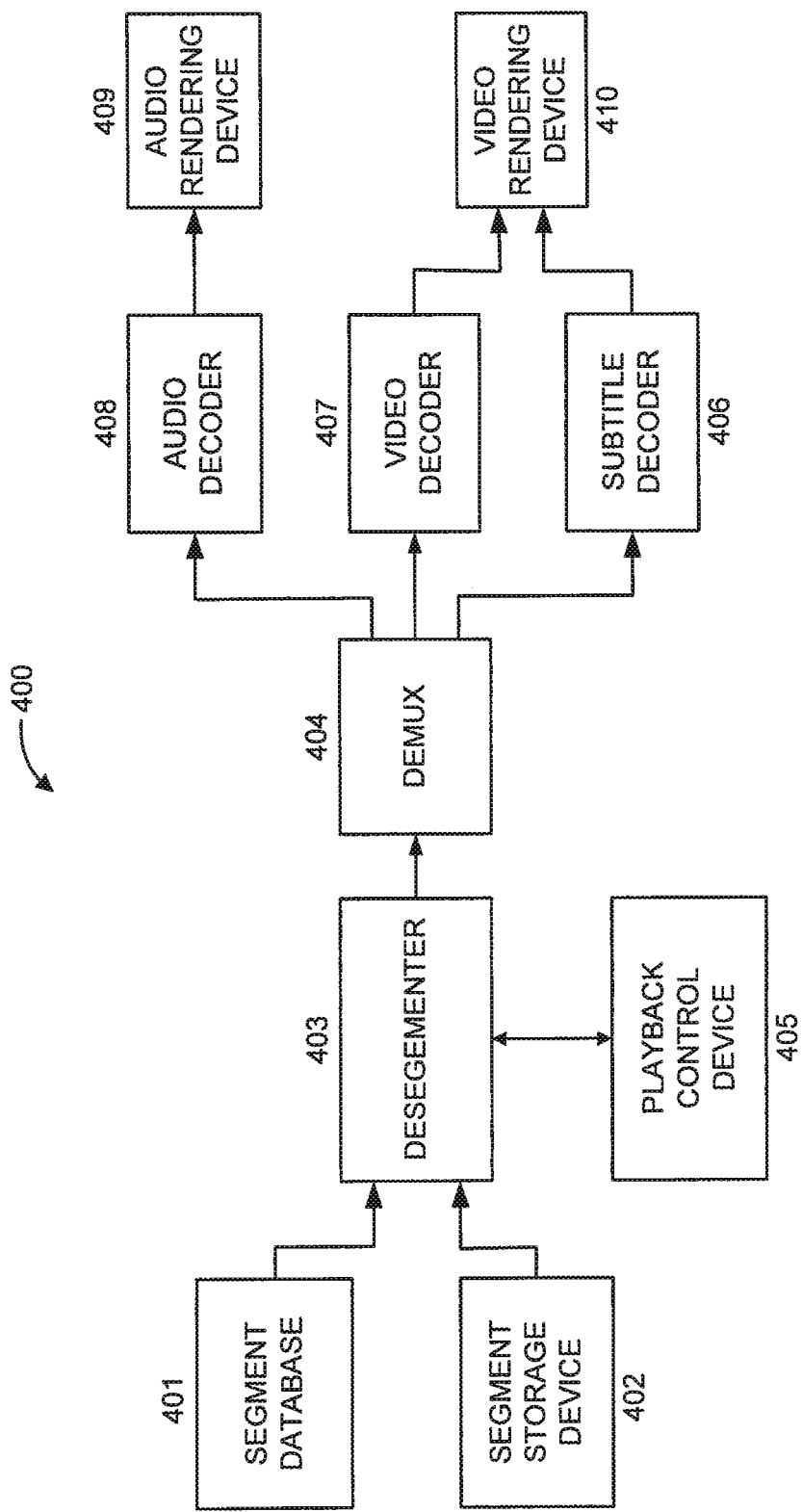
FIG. 4 is a diagram showing an exemplary playback pipeline 300 to which the present principles can be applied, in accordance with an embodiment of the present principles.

FIG. 4 shows an exemplary playback pipeline 300 to which the present principles can be applied, in accordance with an embodiment of the present principles. The playback pipeline 400 plays back recorded segments. In an embodiment, the playback pipeline 400 is included within the set-top box 200 of FIG. 2. However, as noted above, the playback pipeline 400 can be included in other devices including, but not limited to, a stand-alone DVR, a home media server, a computer media station, a tablet device, a home network gateway, a multi-media player, a home networking appliance, and so forth.

The playback pipeline 400 includes a segment database 401, a segment storage device 402, a desegmenter 403, a demultiplexer 404, a playback control device 405, a subtitle decoder 406, a video decoder 407, an audio decoder 408, an audio rendering device 209, and a video rendering device 210.

Playback control device 405 controls and/or otherwise indicates to the desegmenter 403 which playlist should be played. Playback control device 405 also controls and/or otherwise indicates to the desegmenter 403 to begin playback at a specified time offset and to playback at a specified rate. For example, a playback rate of 1.0 would correspond to normal playback, 4.0 would be a 4× fast forward, −4.0 would be 4× rewind, and 0.0 would be pause.

The desegmenter 403 queries the segment database 401 to find the transport and index segment files required for playback. The desegmenter 403 then reads these files from segment storage device 402. Indexing information is used by the desegmenter 403 to skip to a defined offset in a segment in cases where playback is to begin at some time offset into the segment. The desegmenter 403 then sends data (e.g., a transport stream) from the segment storage device 402 to the demultiplexer 404.

The demultiplexer 404 splits the transport stream into audio, video, and subtitle elementary streams and sends these streams to the audio decoder 408, video decoder 407, and subtitle decoder 406, respectively. The output from the audio decoder 408 is then sent to an audio rendering device 409 which is responsible for final rendering of the audio. The outputs from the video decoder 407 and subtitle decoder 406 are sent to the video rendering device 410 which is responsible for final rendering of the video.

Figure 5:
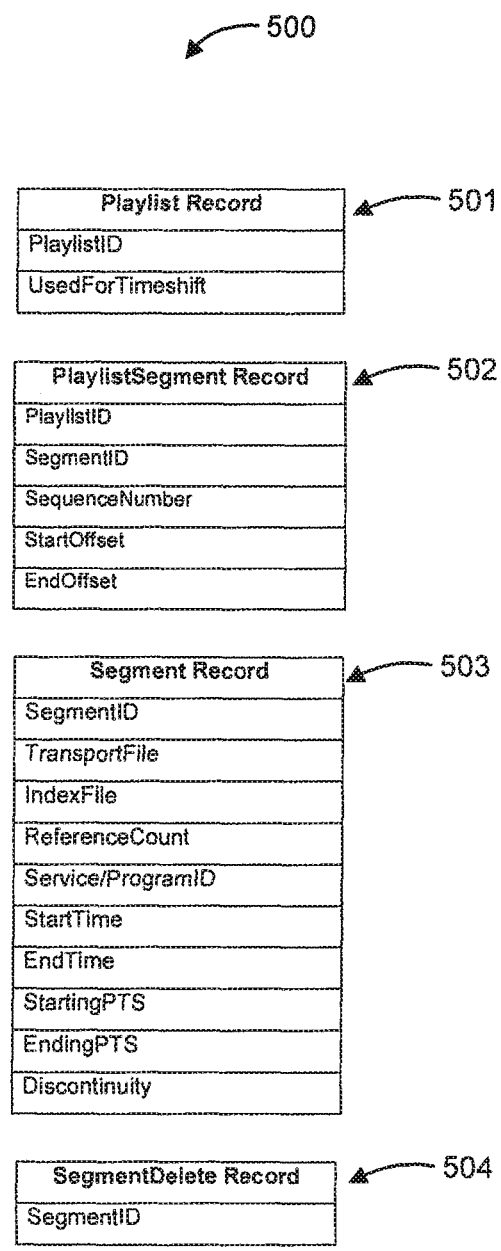
FIG. 5 is a diagram showing four exemplary record types 500 that exist in the segment database, in accordance with an embodiment of the present principles.

FIG. 5 shows four exemplary record types 500 that exist in the segment database (e.g., segment database 305 and segment database 401), in accordance with an embodiment of the present principles. The record types include the following: Playlist records 501; PlaylistSegment records 502; Segment records 503; and SegmentDelete records 504. Each Playlist record 501 represents a recording. Each Segment record 403 represents a recorded segment stored on disk. Each PlaylistSegment record 402 associates a Segment record 503 with a Playlist record 501. Finally, SegmentDelete records 504 are used to track recorded segments that are marked for deletion.

A description will now be given regarding some exemplary scenarios to which the present principles can be applied, in accordance with an embodiment of the present principles.

If a user is watching live broadcast content and decides to start recording, it is desirable to use available time-shift data to create a complete recording of an event even if the user did not make a recording request until sometime after the start of an event. As an example, assume that a user is watching an event that began at 8:00 pm. At 8:10 pm, the user requests to record the event. If the time-shift buffer includes content from 8:00 pm through 8:10 pm, it should be possible to create a complete recording of the entire event. The present invention provides a means for converting time-shift data into a recording without requiring copying of the time-shift data to form the new recording.

In some instances it is possible for multiple recordings to share some of the same content. For example, assume event A begins at 8:00 PM and ends at 8:30 PM and event B begins at 8:30 PM and ends at 9:00 PM on the same channel. A user may request to record both event A and event B. Further, the user's recording preferences may indicate that all recordings should begin 5 minutes early and end 5 minutes late. In this scenario there is an overlap where the last 10 minutes of recording A will include the same content as the first 10 minutes of recording B. The present principles provide a way to optimize the storage of such overlapping recordings by allowing the overlapping portion of the recording to be stored in one location and shared by the two recordings instead of duplicating the shared data.

On most DVRs, a user can either select a particular event to record, or can schedule a recording based on a time range and channel. When the user schedules by time and channel, most DVRs will show the recording as a generic entry that says something like "Manual Recording 8 pm-10 pm on channel 99". The recording may include multiple events, but there is no way to know what the recording includes. There is also no way to pick out a particular event and play it, or to keep an event in the recording and delete the rest. For example, the above referenced manual recording might include an episode of Program A that the user wants to keep from 8:30 pm-9 pm, but the user might want to delete everything else. The present principles provide a solution to these problems.

A description will now be given regarding creating a recording, in accordance with an embodiment of the present principles.

When a recording is started, first a new playlist record 501 is added to the segment database to represent the new recording. The playlist record is assigned a new unique PlaylistID and the UsedForTimeshift field is set to indicate whether this playlist is for a normal recording or for time-shift.

After the playlist is created, the recording control configures the recording pipeline 300 to begin recording. The segmenter 303 then creates a new Segment record 503 and PlaylistSegment record 502 in the segment database 305 and begins writing the first transport file and index file to disk.

The Segment record 503 is created with the following values:
SegmentID—a unique ID for the segment
TransportFile—the file used for storing transport stream data for this segment
IndexFile—the file used for storing index information for this segment
ReferenceCount—this is a count of the number of PlaylistSegment records that reference this segment. If the current recording only applies to one playlist, it will be set to 1.
Service/Program ID—This identifies the service (channel) being recorded
StartTime—the start time of the segment in UTC
EndTime—this is the end time of the segment, but is unknown until the segment is complete. Initially this value is set to 0.
StartingPTS—this is the first PTS in the segment. If the first PTS is unknown at segment creation, this value is initially set to 0.
EndingPTS—this is the ending PTS value for the segment, but it is unknown initially and set to 0.
Discontinuity—this is a flag that indicates a PTS discontinuity exists within the segment. It is initially set to FALSE.

The PlaylistSegment record 502 is created with the following values:
PlaylistID—the PlaylistID for the Playlist record associated with this segment
SegmentID—the SegmentID of the Segment record
SequenceNumber—this is an integer that increments for each segment added to a playlist. The initial value is 0.
StartOffset—this is initially set to 0.
EndOffset—this is initially set to 0.

When recording, a PlaylistSegment record 502 is created for each playlist for each segment. Thus, if data was being recorded into three playlists, each Segment record would have 3 PlaylistSegment records 502. Also, each Segment record would have its reference count set to 3, because there are 3 PlaylistSegment records 502 that reference the segment.

A typical segment size would include about 1 to 5 minutes of data. After each segment is complete, the segmenter 303 updates the Segment record 503 with final data for the segment. This will include the EndTime, EndingPTS, Discontinuity flag, and the StartingPTS if it was not known at the start of the recording. The segmenter 303 then begins writing the next segment, creating a new Segment record 503 and PlaylistSegment records 502. This process continues until the recording is complete.

FIG. 6 shows an exemplary method 600 for starting a recording, in accordance with an embodiment of the present principles. At step 610, a playlist is created. At step 620, it is determined whether or not a recording pipeline already exists for a desired service. If so, then the method 600 proceeds to a step 615. Otherwise, the method 600 proceeds to a step 660. At step 615, the playlist is added to the segmenter 303 of the existing recording pipeline.

At step 620, it is determined whether or not the segmenter 303 is in the middle of a segment. If so, then the method 600 proceeds to a step 625. Otherwise, the method 600 proceeds to a step 645.

At step 625, the segmenter 303 creates a PlaylistSegment record 502 for the new playlist with an adjusted start offset for the current position.

At step 630, the reference count on the segment is incremented.

At step 635, it is determined whether or not the segment is complete. If so, then the method 600 proceeds to a step 640. Otherwise, the method 600 proceeds to a step 650.

At step 640, the Segment record 503 is updated with final timestamps.

At step 645, the segmenter 303 writes the new segment and indexes files (for the new segment), creates a Segment record 503, and creates a PlaylistSegment record 502 for each playlist.

At step 660, a recording pipeline is created.

At step 650, it is determined whether or not the recording is complete. If so, the method 600 proceeds to a step 655. Otherwise, the method 600 returns to step 635.

At step 655, the recording is stopped (see FIG. 7).

FIG. 7 shows an exemplary method 700 for stopping a recording, in accordance with an embodiment of the present principles. At step 705, a playlist is removed from the segmenter 303. At step 710, it is determined whether or not the segmenter 303 is in the middle of a segment. If so, then the method 700 proceeds to a step 715. Otherwise, the method 700 proceeds to a step 720.

At step 715, the end offset on the last PlaylistSegment record 502 is adjusted.

At step 720, is it determined whether or not the segment includes one or more playlists. If so, then the method 700 is terminated. Otherwise, the method 700 proceeds to a step 725.

At step 725, the recording pipeline is torn down.

Figure 8:
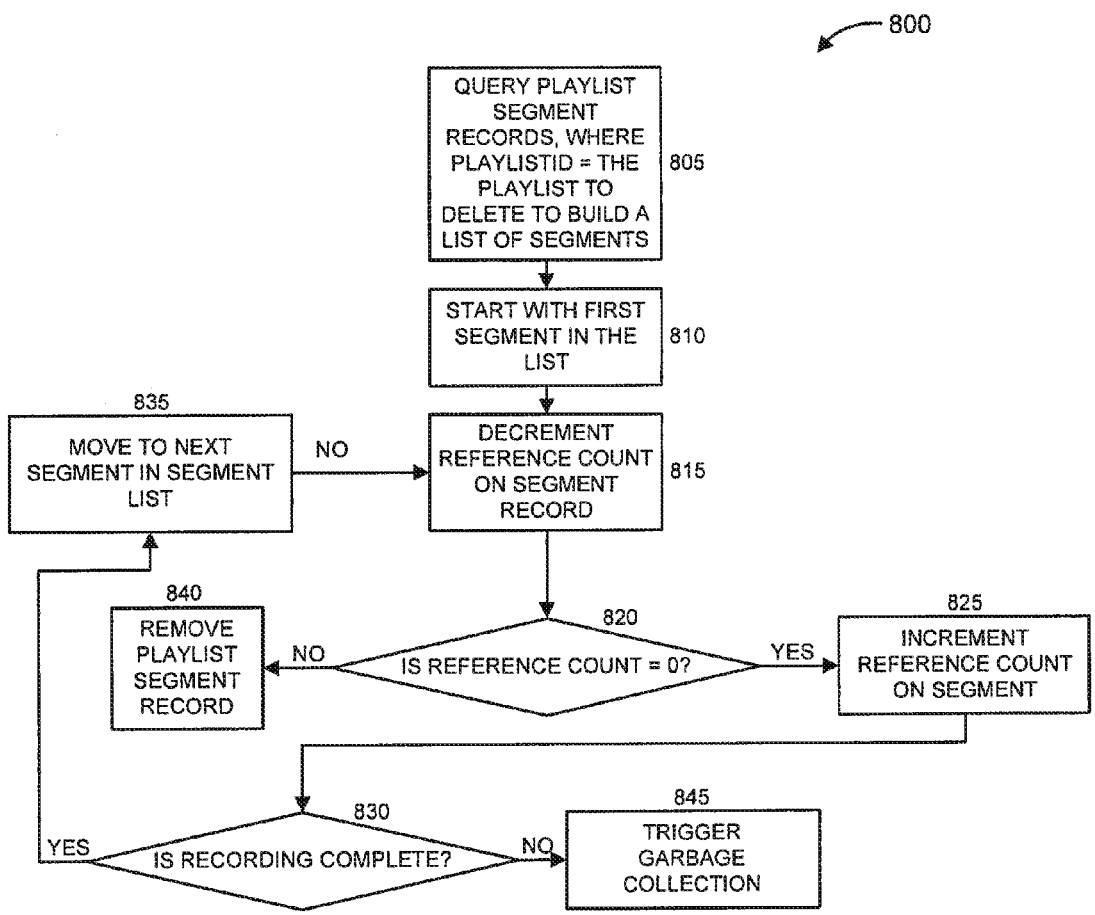
FIG. 8 is a diagram showing an exemplary method 800 for deleting a recording, in accordance with an embodiment of the present principles.

FIG. 8 shows an exemplary method 800 for deleting a recording, in accordance with an embodiment of the present principles. At step 805, Playlist Segment records 502 are queried, where PlaylistID=the playlist to delete to build a list of segments. At step 810, the method 800 starts with the first segment in the list. At step 815, the reference count on the Segment record 503 is decremented. At step 820, it is determined whether or not the reference count=0. If so, then the method 800 proceeds to a step 825. Otherwise, the method 800 proceeds to a step 840.

At step 825, a SegmentDelete record 504 is created with SegmentID.

At step 830, it is determined whether or not there are more segments. If so, then the method 800 proceeds to a step 835. Otherwise, the method 800 proceeds to a step 845.

At step 835, the method 800 moves to the next segment in the list.

At step 845, garbage collection is triggered.

Figure 9:
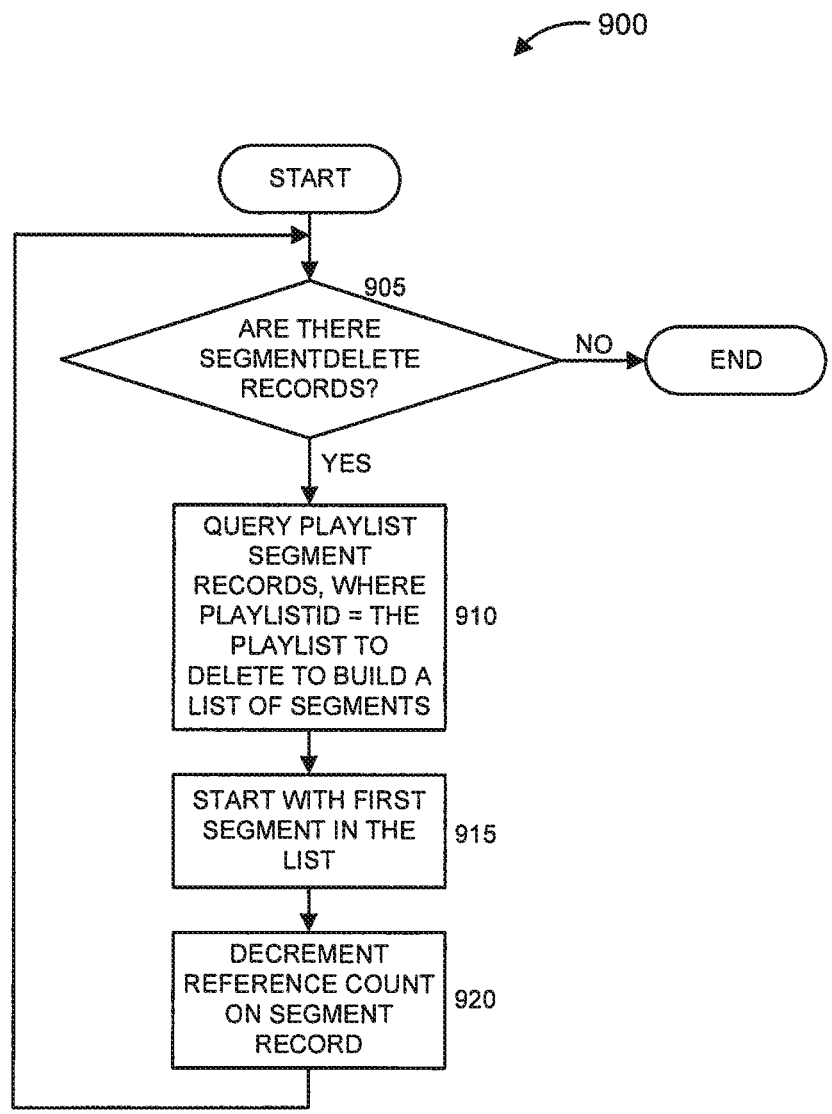
FIG. 9 is a diagram showing an exemplary method 900 for garbage collecting segments, in accordance with an embodiment of the present principles.

FIG. 9 shows an exemplary method 900 for garbage collecting segments, in accordance with an embodiment of the present principles. At step 905, it is determined whether or not there are SegmentDelete records 504. If so, then the method 900 proceeds to a step 910. Otherwise, the method 900 is terminated. At step 910, the transport and index file are deleted. At step 915, the Segment record 503 is deleted. At step 920, the SegmentDelete record 504 is deleted.

Figure 10:
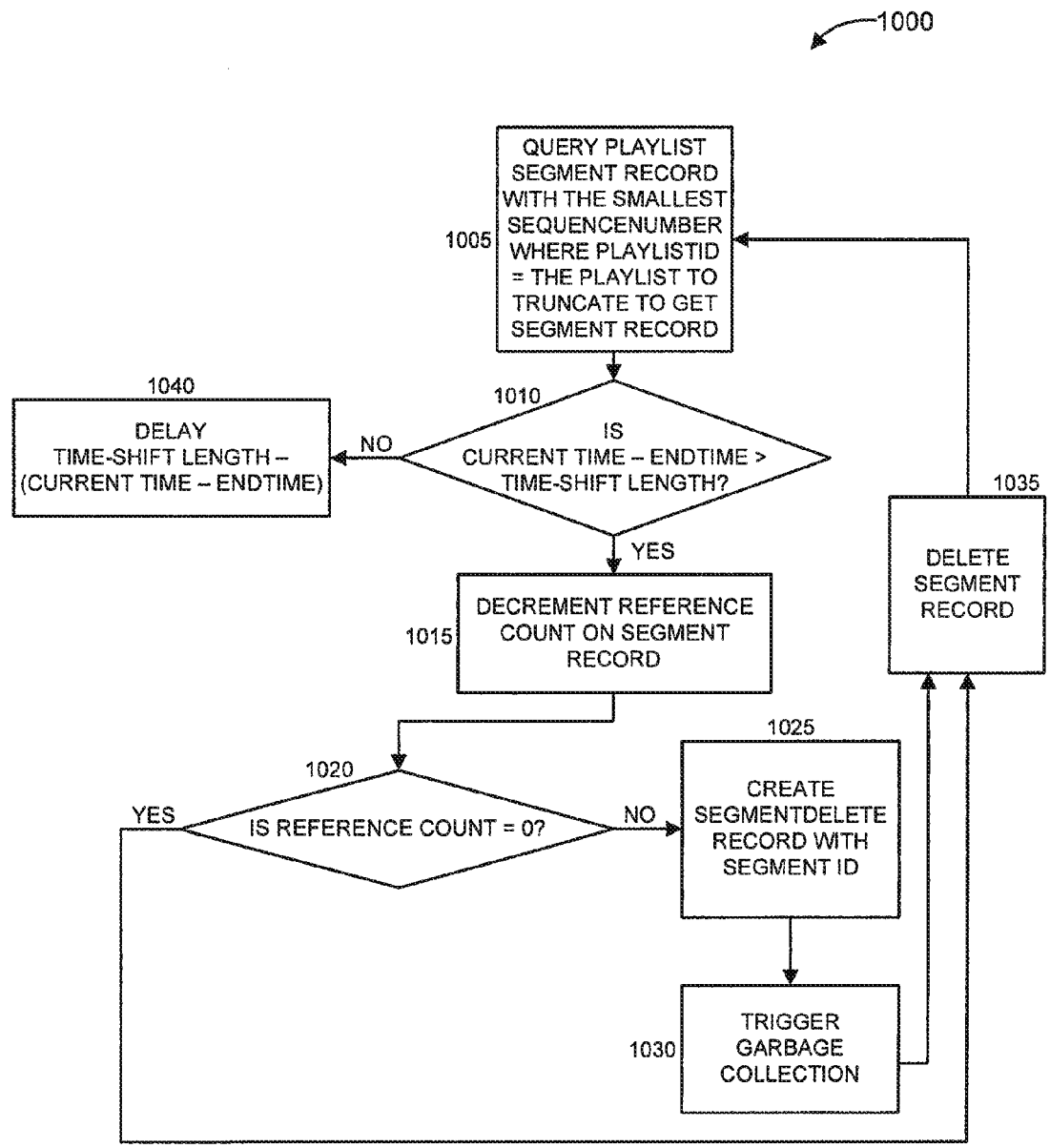
FIG. 10 is a diagram showing an exemplary method 1000 for truncating data from the start of a recording, in accordance with an embodiment of the present principles.

FIG. 10 shows an exemplary method 1000 for truncating data from the start of a recording, in accordance with an embodiment of the present principles. At step 1005, the PlaylistSegment record 502 with the smallest Segment record 503 is queried, where PlaylistID=the playlist to truncate to get segment record. At step 1010, it is determined whether or not the current time−EndTime≥time-shift length. If so, then the method 1000 proceeds to a step 1015. Otherwise, the method proceeds to a step 1040.

At step 1015, the reference count on the Segment record 503 is decremented. At step 1020, it is determined whether or not the reference count=0. If so, then the method 1000 proceeds to a step 1025. Otherwise, the method 1000 proceeds to a step 1035.

At step 1025, a SegmentDelete record 504 is created with SegmentID. At step 1030, garbage collection is triggered.

At step 1035, the Segment record 503 is deleted.

At step 1040, cause a delay=time-shift length−(current time−EndTime).

Figure 11:
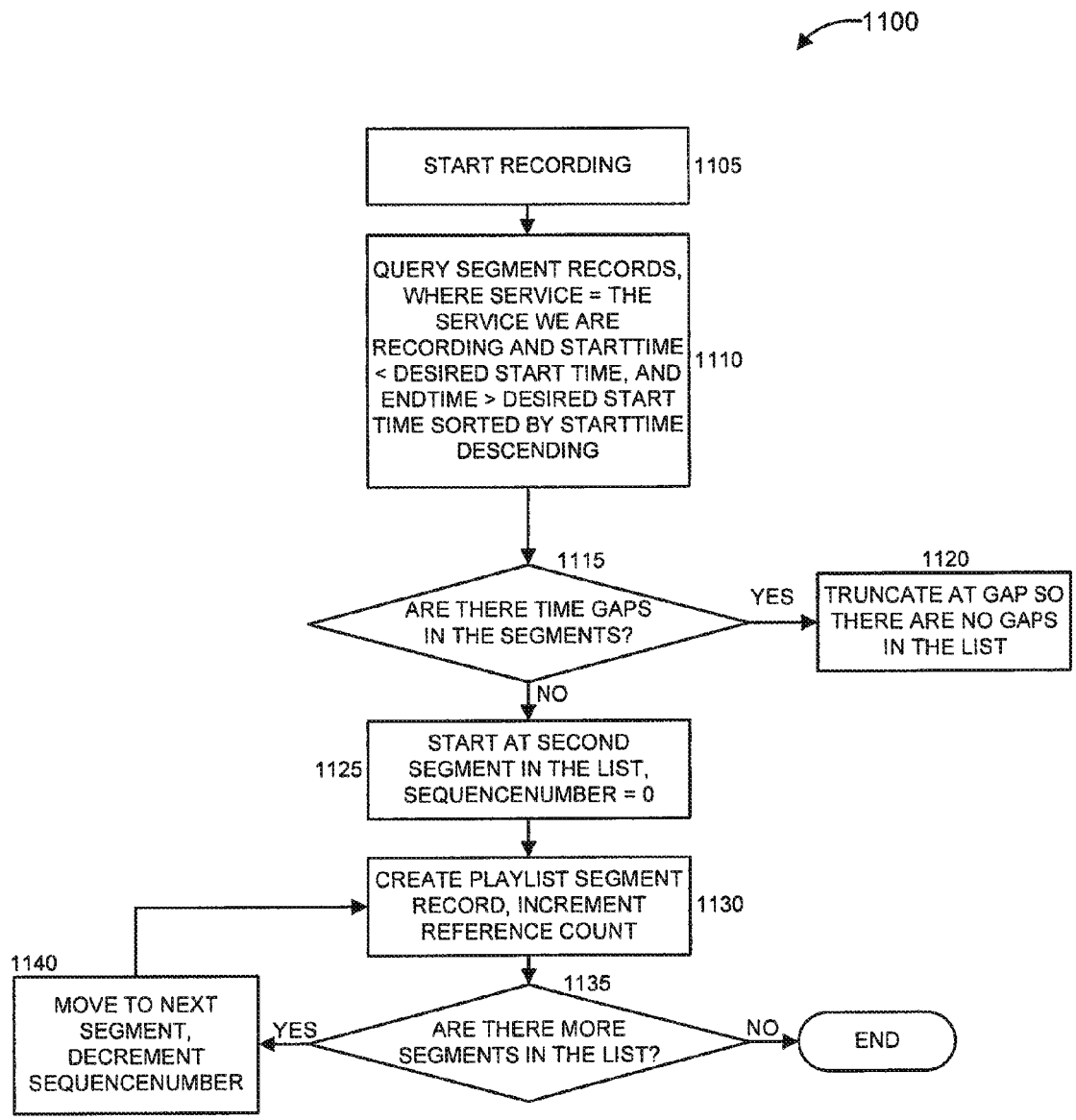
FIG. 11 is a diagram showing an exemplary method 1100 for appending segments to the start of a recording, in accordance with an embodiment of the present principles.

FIG. 11 shows an exemplary method 1100 for appending segments to the start of a recording, in accordance with an embodiment of the present principles. The method 1100 can be used to prepend time-shift data to the start of a recording. At step 1105, recording is started (see FIG. 6). At step 1110, Segment records 503 are queried, where Service=the service we are recording and StartTime≤desired StartTime, and EndTime>desired start time sorted by StartTime descending. At step 1115, it is determined whether or not there are time gaps in the segments. If so, then the method 1100 proceeds to a step 1120. Otherwise, the method proceeds to a step 1125.

At step 1120, truncation is performed at the gaps so there are no (more) gaps in the list.

At step 1125, the method 1100 starts at the second segment in the list, with SequentNumber=0.

At step 1130, a Playlist Segment record 502 is created, and a reference count is incremented. At step 1135, it is determined whether or not there are more segments in the list. If so, then the method 1100 proceeds to step 1140. Otherwise, the method 1100 is terminated. At step 1140, the method 1100 moves to the next segment, and decrements SequenceNumber.

Figure 12:
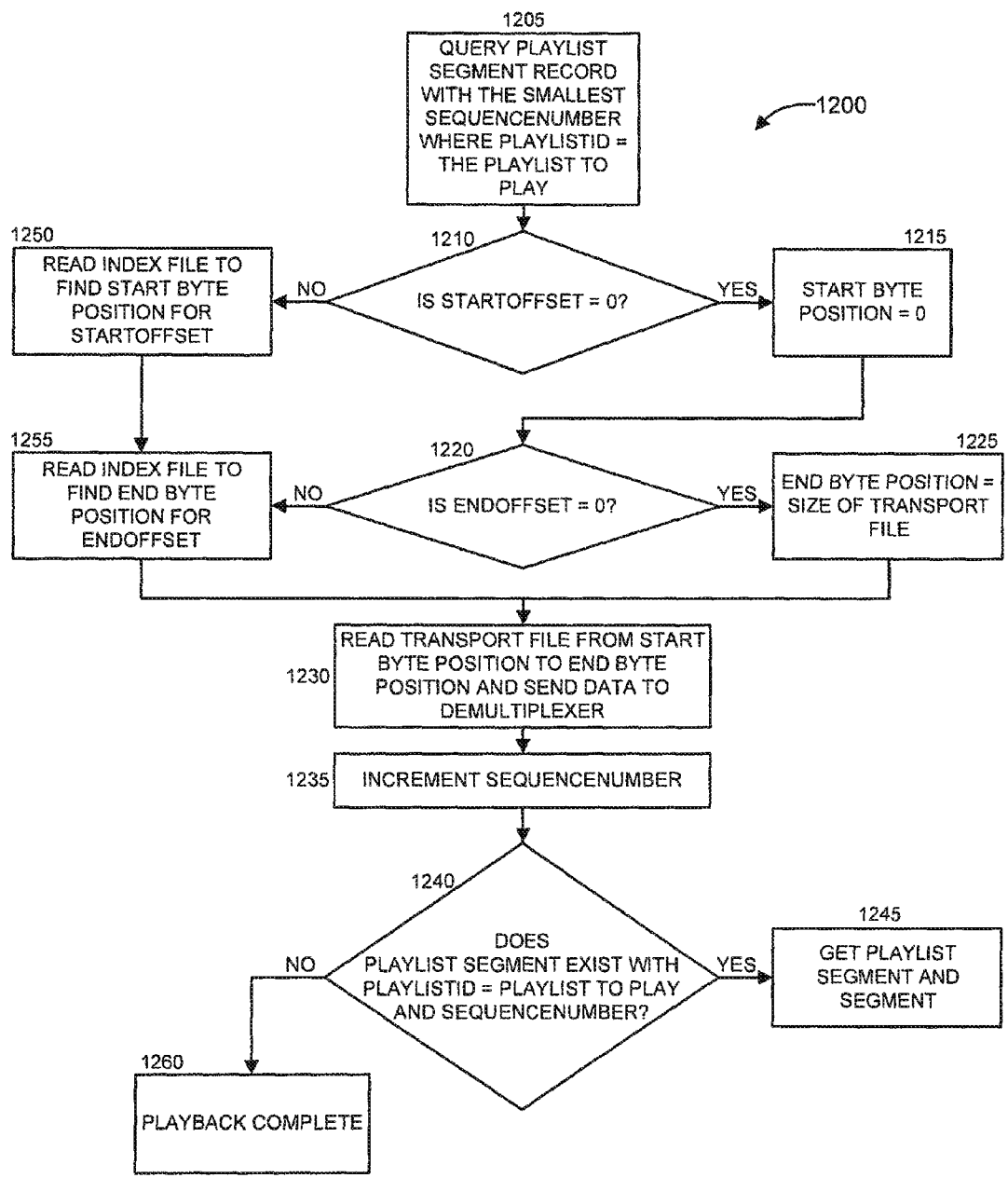
FIG. 12 is a diagram showing an exemplary method 1200 for playing back a recording, in accordance with an embodiment of the present principles.

FIG. 12 shows an exemplary method 1200 for playing back a recording, in accordance with an embodiment of the present principles. At step 1205, the Playlist Segment record 502 with the smallest SequenceNumber is queried, where PlaylistID=the playlist to play. At step 1210, it is determined whether or not the StartOffset=0. If so, then the method 1200 proceeds to a step 1215. Otherwise, the method 1200 proceeds to a step 1250.

At step 1215, the starting byte position is set to 0.

At step 1220, it is determined whether or not the EndOffset=0. If so, then the method 1200 proceeds to a step 1225. Otherwise, the method 1200 proceeds to a step 1255.

At step 1225, the end byte position is set equal to the size of the transport file.

At step 1230, the transport file is read from the start byte position to the end byte position and the data is sent to the demultiplexer 404. At step 1235, the SequenceNumber is incremented. At step 1240, it is determined whether or not a playlist segment exists with PlaylistID=Playlist to play and sequent number. If so, then the method 1200 proceeds to step 1245. Otherwise, the method 1200 proceeds to step 1260.

At step 1245, the playlist segment and the segment are retrieved.

At step 1250, the index file is read to find the start byte position for StartOffset.

At step 1255, the index file is read to find the end byte position for the EndOffset.

At step 1260, playback is complete.

A description will now be given regarding adding/removing playlists during recording operations, in accordance with an embodiment of the present principles.

In cases where the same data is being used for multiple playlists, it is sometimes necessary to add or remove a playlist from the segmenter 303 during a recording operation. The StartOffset and EndOffset fields in PlaylistSegment records 502 are used for this purpose. Assume our system uses 5 minute segments. Further, assume 2 minutes into a segment a second playlist is added to the recording. At this point a new PlaylistSegment record 502 is created, the Segment record's reference count is incremented, and the fields in the PlaylistSegment are filled out as before with the exception of the StartOffset field. The StartOffset field is set to 120 seconds to indicate that playback for this segment should begin at an offset of 120 seconds into the segment. Likewise, if data is being recorded to multiple playlists and recording is stopped for a single playlist, the EndOffset field is set to the offset from the end of the segment where playback should stop.

A description will now be given regarding deleting recordings, in accordance with an embodiment of the present principles. This process is also described above with respect to FIG. 8.

Each recording corresponds to a playlist. When a recording is deleted, the following actions are performed on the segment database:
1. The Playlist record 501 for the recording is deleted.
2. All PlaylistSegment records 502 that reference the deleted PlaylistID are deleted.
3. For each deleted PlaylistSegment record 502, the Segment record 503 corresponding to the SegmentID in the deleted PlaylistSegment record 502 has its ReferenceCount field decremented by one.
4. For each Segment record 503 whose ReferenceCount is now 0, a new SegmentDelete record 504 is created with the SegmentID set to the segment with the 0 ReferenceCount.

The above 4 operations must be performed atomically on the database so that if a power failure occurs during the operation, the database remains in a consistent state.

As also described with respect to FIG. 9 above, a background process periodically queries the SegmentDelete records 504, looks up the corresponding Segment record 503, deletes the IndexFile and TransportFile, and then removes the Segment record 503 and SegmentDelete record 504. This can be done immediately after deletion, or this operation can be delayed until disk space is needed.

A description will now be given regarding creating playlists for time-shift, in accordance with an embodiment of the present principles.

Creating a playlist for time-shift is the same as creating a playlist for recording with two exceptions:
1. The UsedForTimeshift flag in the Playlist record is set to TRUE. Each time the set-top box 200 is booted, all Playlists with UsedForTimeshift set to TRUE are deleted as time-shift playlists do not need to be preserved through a reset.
2. PlaylistSegments from the beginning of the recording are periodically deleted.

This process follows the same process as for deleting an entire playlist only the Playlist record is not deleted and only the specified PlaylistSegment record 502 is removed. Periodically deleting PlaylistSegments bounds the size of the time-shift buffer. For example, if we wanted to maintain a 30 minute time-shift buffer and our segment size was 5 minutes, we would keep no more than 6 complete segments for the playlist. When the 7th segment is complete, we would delete the first PlaylistSegment bringing the total number of segments for the playlist back to 6.

A description will now be given regarding converting time-shift data to a recording, in accordance with an embodiment of the present principles. This process is also described above with respect to FIG. 10.

When a recording is requested for an event that is already in progress, the segment database is queried for Segment records 503 that match the time range and service for the event. This is done by querying the StartTime, EndTime, and Service/Program ID fields. If segments are found that correspond to the service and time range of the requested event, new PlaylistSegment records 502 are created for each of these segments and inserted with sequence numbers such that they appear in the proper sequence at the start of the recording. The StartOffset of the first segment is adjusted as necessary to match the starting time for the event. In addition, the ReferenceCount field for each of the added segments is incremented. This process allows existing data used for time-shift to be added to the recording without actually copying or modifying any transport or index files.

A description will now be given regarding playing back a recording or a time-shift, in accordance with an embodiment of the present principles. This process is also described above with respect to FIG. 12.

Basic playback has already been described with respect to FIG. 4. We now describe the database operations performed by the desegmenter 403 during a playback operation in more detail.

When playing back a recording from the start, the desegmenter 403 queries the PlaylistSegment record 502 with the lowest sequence number. The desegmenter 403 then queries the corresponding Segment record 503 to find the TransportFile and IndexFile. If StartOffset on the PlaylistSegment record is 0, playback begins at the start of the transport file. If StartOffset is non-zero, the offset is converted into a PTS offset by using the StartTime and StartingPTS fields as a base time for the start of the segment. The index file is scanned to find the byte position in the transport file corresponding to the specified PTS offset and playback begins from that position.

To handle a seek to a specified offset in a playlist, the desegmenter 403 queries the PlaylistSegment records 502 to get a list of SegmentIDs for the playlist. The desegmenter 403 then queries the Segment record 503 with the lowest sequence number to read the StartTime. This is the base start time for the playlist. The desegmenter 403 then adds the specified offset to the base time to calculate the absolute time of the desired position. Finally, the desegmenter 403 searches for the Segment record 503 that includes the specified time by comparing the StartTime and EndTime fields for the Segment records 503 that are part of the playlist. This gives the transport and index file including the desired position. The desired absolute time is then converted into a PTS timestamp by using the StartTime and StartingPTS fields on the Segment record 503 as a base time for the segment and then calculating the desired PTS offset. The index file is then scanned to find the byte offset in the transport file for the desired PTS offset. The desegmenter 403 then begins playback from this point in the transport file.

Discontinuous trick modes (fast forward and rewind) are handled the same way as seek operations. For example, to implement a 4× fast forward the desegmenter 403 may seek 2 seconds forward in the playlist every 0.5 seconds. This has the effect of scanning through the playlist at a rate of 4× normal playback.

To ensure database operations required for seek operations are efficient, it is expected that the database 401 will provide proper indexing to ensure the required queries execute quickly. In addition, the desegmenter 403 may cache or pre-fetch data from the database 401 to improve performance. These details are specific to particular database implementations and are beyond the scope of the present principles.

A description will now be given regarding the creation and management of recordings and sub-recordings, in accordance with an embodiment of the present principles.

The principles described herein allow a user to create a recording on a channel for a defined time range and manage the recorded content both as a contiguous recording and as discrete events within the recorded block.

When a user schedules a recording by time and channel using the present principles, a query of a database including electronic program guide (EPG) data occurs to determine which events will be included in the recording. The system then creates multiple recordings. The parent recording will be a contiguous recording covering the time range requested by the user. In parallel with the parent recording, the system will create recordings for each event that the parent recording includes, as reported by the EPG data. TABLE 1 below shows an example of this.

TABLE 1

Manual Recording - 8 PM to 10 PM on channel 99

| Program A | Program B | News Special - Presidential Debate |

Thus, in this example, the present principles create four recordings, even though the user only requested recording from 8 pm to 10 pm on channel 99. The system does not actually record any additional data to do this. The present principles use a segmented recording architecture as described herein.

Figure 13:
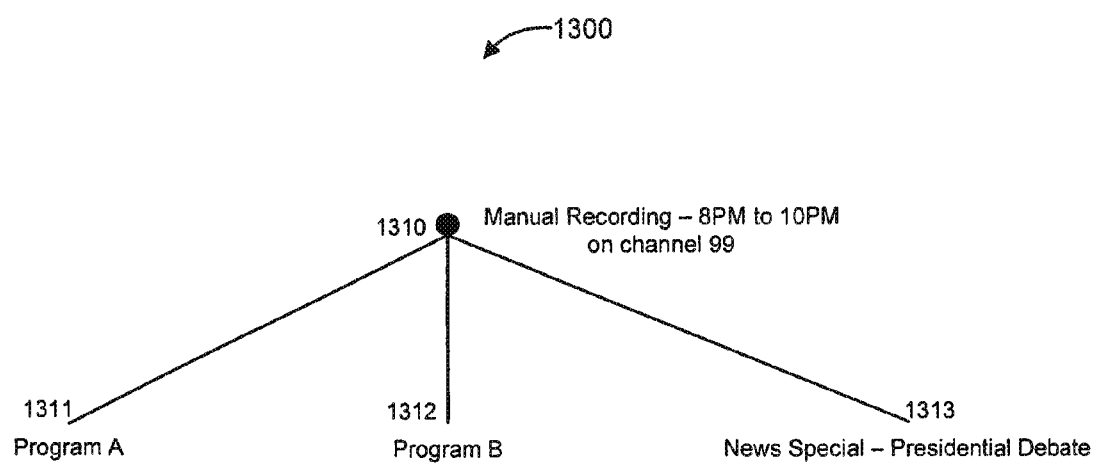
FIG. 13 is a diagram showing an exemplary recording tree index 1300, in accordance with an embodiment of the present principles.

Due to the parent-child relationship between the recordings, the manual recording can be presented to the user in a tree structure that can be expanded and collapsed with the parent recording being the root node of the tree. FIG. 13 is a diagram showing an exemplary recording tree index 1300, in accordance with an embodiment of the present principles. Thus, for the example above, the recordings might be displayed to the user as shown in FIG. 13. The "Manual Recording—8 PM to 10 PM on channel 99" is shown at the root 1310 of the tree index 1300. "Program A", "Program B", and "News Special—Presidential Debate" are shown as branches and/or leaves 1311, 1312, and 1313.

The user could then choose to play the manual recording, and would see everything as a contiguous block. The user could also decide to play only Program A within the recording, and playback would start at the beginning of the episode and end at the end of the episode of Program A.

The user could also delete the manual recording, but choose to keep a particular episode included within the manual recording. For example, a user might want to keep the episode of Program A, but delete everything else. The actual recorded video and audio data is shared between the parent recording and child recordings and is reference counted, so the data in each segment is only removed from the disk when it is no longer referenced by any recording in the list.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Herein, the phrase "coupled" is defined to mean directly connected to or indirectly connected with through one or more intermediate components. Such intermediate components may include both hardware and software based components.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the first and third listed options (A and C) only, or the selection of the second and third listed options (B and C) only, or the selection of all three options (A and B and C).

This may be extended, as readily apparent by one of ordinary skill in this and related arts, for as many items listed.

It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. A system for recording media content, comprising:
a segmenter splitting transport stream data and index data corresponding to the media content into discrete files at periodic intervals on access point boundaries, each of the discrete files including a respective transport segment and a respective index segment;
a segment storage device storing the discrete files in a segment database, wherein the segment database comprises information that allows groups of transport segments to be played back in sequence, each of the groups of transport segments corresponding to a respective program; and
a recording control device responsive to a request to record a program to configure the system to begin recording, wherein the segmenter adds to the segment database
a first record of a first type representing a recording of the program, and
a second record of a second type representing a recorded segment of the recording of the program and including a value indicating a file used for storing index information for the recorded segment, and
a third record of a third type associating the second record with the first record; and
wherein the program to be recorded comprises a program in progress and the recording control device querying the segment database to find an existing segment stored in the segment database matching a time range and a service for the program, and adding the existing segment at a start of the recording.

2. The system of claim 1, wherein the second record of the second type comprises a segment record corresponding to the respective transport segment and comprising a unique segment identifier, a transport file indicator for indicating a file that stores transport stream data for the respective transport segment, the value comprising an index file indicator for indicating a file that stores index information for the respective transport segment, a start time of the respective transport segment, and an end time of the respective transport segment.

3. The system of claim 1, wherein the recording control device prepends a segment from another recording to a beginning of a new recording for seamless playback of the new recording inclusive of the pre-pended segment.

4. The system of claim 1, wherein the recording control device truncates a segment from a start of a recording that is in progress to simulate a rolling buffer having a fixed length.

5. A method for recording media content, comprising:
splitting transport stream data and index data corresponding to the media content into discrete files at periodic intervals on access point boundaries, each of the discrete files including a respective transport segment and a respective index segment; and
storing the discrete files in a segment database stored in a segment storage device, wherein the segment database comprises information that allows groups of transport segments to be played back in sequence, each of the groups of transport segments corresponding to a respective program; and
adding records to the segment database responsive to a request to record a program, wherein the added records comprise
a first record of a first type representing a recording of the program, and
a second record of a second type representing a recorded segment of the recording of the program and including a value indicating a file used for storing index information for the recorded segment, and
a third record of a third type associating the second record with the first record; and
querying the segment database responsive to the request to record a program comprising a request to record a program in progress to find an existing segment stored in the segment database matching a time range and a service for the program, and adding the existing segment at a start of the recording.

6. The method of claim 5, wherein the second record of the second type comprises a segment record corresponding to a respective transport segment and comprises a unique segment identifier, a transport file indicator for indicating a file that stores transport stream data for the respective transport segment, the value comprising an index file indicator for indicating a file that stores index information for the respective transport segment, a start time of the respective transport segment, and an end time of the respective transport segment.

7. The method of claim 5, further comprising prepending a segment from another recording to a beginning of a new recording for seamless playback of the new recording inclusive of the pre-pended segment.

8. The method of claim 5, further comprising truncating a segment from a start of a recording that is in progress to simulate a rolling buffer having a fixed length.

9. A computer-readable non-transitory storage medium having a computer-readable program code embodied therein for causing a computer system to perform the method of claim 5.

10. A system for recording media content, comprising:
a segmenter splitting transport stream data and index data corresponding to the media content into discrete files at periodic intervals on access point boundaries, each of the discrete files including a respective transport segment and a respective index segment;
a segment storage device storing the discrete files in a segment database, wherein the segment database comprises information that allows groups of transport segments to be played back in sequence, each of the groups of transport segments corresponding to a respective program; and
a recording control device responsive to a request to record a program to configure the system to begin recording, wherein the segmenter adds to the segment database
a first record of a first type representing a recording of the program, and
a second record of a second type representing a recorded segment of the recording of the program and including a value indicating a file used for storing index information for the recorded segment, and
a third record of a third type associating the second record with the first record.

11. The system of claim 10, wherein the second record of the second type comprises a segment record corresponding to the respective transport segment and comprises a unique segment identifier, a transport file indicator for indicating a file that stores transport stream data for the respective transport segment, the value comprising an index file indicator for indicating a file that stores index information for the respective transport segment, a start time of the respective transport segment, and an end time of the respective transport segment.

12. The system of claim 11, wherein the first record of the first type comprises a playlist record representing the recording and including a playlist ID and a data field indicating whether the recording is for time-shift.

13. The system of claim 12, wherein the third record of the third type comprises a playlist segment record associating the segment record with the playlist record.

14. A method for recording media content, comprising:
splitting transport stream data and index data corresponding to the media content into discrete files at periodic intervals on access point boundaries, each of the discrete files including a respective transport segment and a respective index segment; and
storing the discrete files in a segment database stored in a segment storage device, wherein the segment database comprises information that allows groups of transport segments to be played back in sequence, each of the groups of transport segments corresponding to a respective program; and
adding records to the segment database responsive to a request to record a program, wherein the added records comprise
a first record of a first type representing a recording of the program, and
a second record of a second type representing a recorded segment of the recording of the program and including a value indicating a file used for storing index information for the recorded segment, and
a third record of a third type associating the second record with the first record.

15. The method of claim 14, wherein the second record of the second type comprises a segment record corresponding to a respective transport segment and comprises a unique segment identifier, a transport file indicator for indicating a file that stores transport stream data for the respective transport segment, the value comprising an index file indicator for indicating a file that stores index information for the respective transport segment, a start time of the respective transport segment, and an end time of the respective transport segment.

16. The system of claim 15, wherein the first record of the first type comprises a playlist record representing the recording and including a playlist ID and a data field indicating whether the recording is for time-shift.

17. The system of claim 16, wherein the third record of the third type comprises a playlist segment record associating the segment record with the playlist record.

* * * * *